US012670564B2

(12) United States Patent
Sekine

(10) Patent No.: US 12,670,564 B2
(45) Date of Patent: Jun. 30, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Hisato Sekine, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 275 days.

(21) Appl. No.: 18/515,433

(22) Filed: Nov. 21, 2023

(65) Prior Publication Data

US 2024/0177281 A1 May 30, 2024

(30) Foreign Application Priority Data

Nov. 25, 2022 (JP) ................................. 2022-188699

(51) Int. Cl.
G06T 5/92 (2024.01)
G06T 5/20 (2006.01)
(Continued)

(52) U.S. Cl.
CPC .................. G06T 5/92 (2024.01); G06T 5/20 (2013.01); G06T 5/50 (2013.01); G06T 7/13 (2017.01);
(Continued)

(58) Field of Classification Search
CPC ... G06T 5/20; G06T 5/50; G06T 2207/20192; G06T 2207/20221; G06T 5/94
See application file for complete search history.

(56) References Cited

U.S. PATENT DOCUMENTS

2016/0217346 A1* 7/2016 Puetter ...................... G06T 5/73
2020/0290503 A1* 9/2020 Kawata .................... B60Q 1/20
(Continued)

OTHER PUBLICATIONS

He, K., et al., "Single Image Haze Removal Using Dark Channel Prior," Sep. 9, 2010, IEEE Transactions of Pattern Analysis and Machine Intelligence, vol. 33, No. 11, pp. 2341 to 2353 (13 pages).
(Continued)

*Primary Examiner* — Andrew M Moyer
*Assistant Examiner* — Conor A O'Malley
(74) *Attorney, Agent, or Firm* — Venable LLP

(57) ABSTRACT

An image processing apparatus includes a calculation unit calculating ambient light based on an input image, a first generation unit generating a dark channel image having a minimum value of a color channel of a partial region in the input image as a pixel value based on the input image and the ambient light, and generating a transmittance distribution of atmosphere based on the dark channel image, a shaping unit performing processing of shaping the transmittance distribution, by shaping the transmittance distribution by performing a plurality of times of filter processing that can separate an edge and a flat portion of a graph that shows the transmittance distribution, using a luminance image based on the input image, and a second generation unit generating a corrected image in which contrast of the input image is corrected based on a shaped transmittance distribution shaped by the shaping unit and the ambient light.

13 Claims, 15 Drawing Sheets

(51) Int. Cl.
    *G06T 5/50*         (2006.01)
    *G06T 7/13*         (2017.01)

(52) U.S. Cl.
    CPC ............... *G06T 2207/20192* (2013.01); *G06T 2207/20221* (2013.01)

(56)               References Cited

U.S. PATENT DOCUMENTS

2020/0394767 A1*  12/2020  Li  .............................. G06T 5/92
2025/0200710 A1*   6/2025  Feng  ..................... H04N 23/73

OTHER PUBLICATIONS

Liang, Q., et al., "Pyramid Fusion Dark Channel Prior for Single Image Dehazing," May 21, 2021, Computer Vision and Pattern Recognition, City University of Hong Kong (5 pages).

* cited by examiner

FIG. 3

F I G.   4
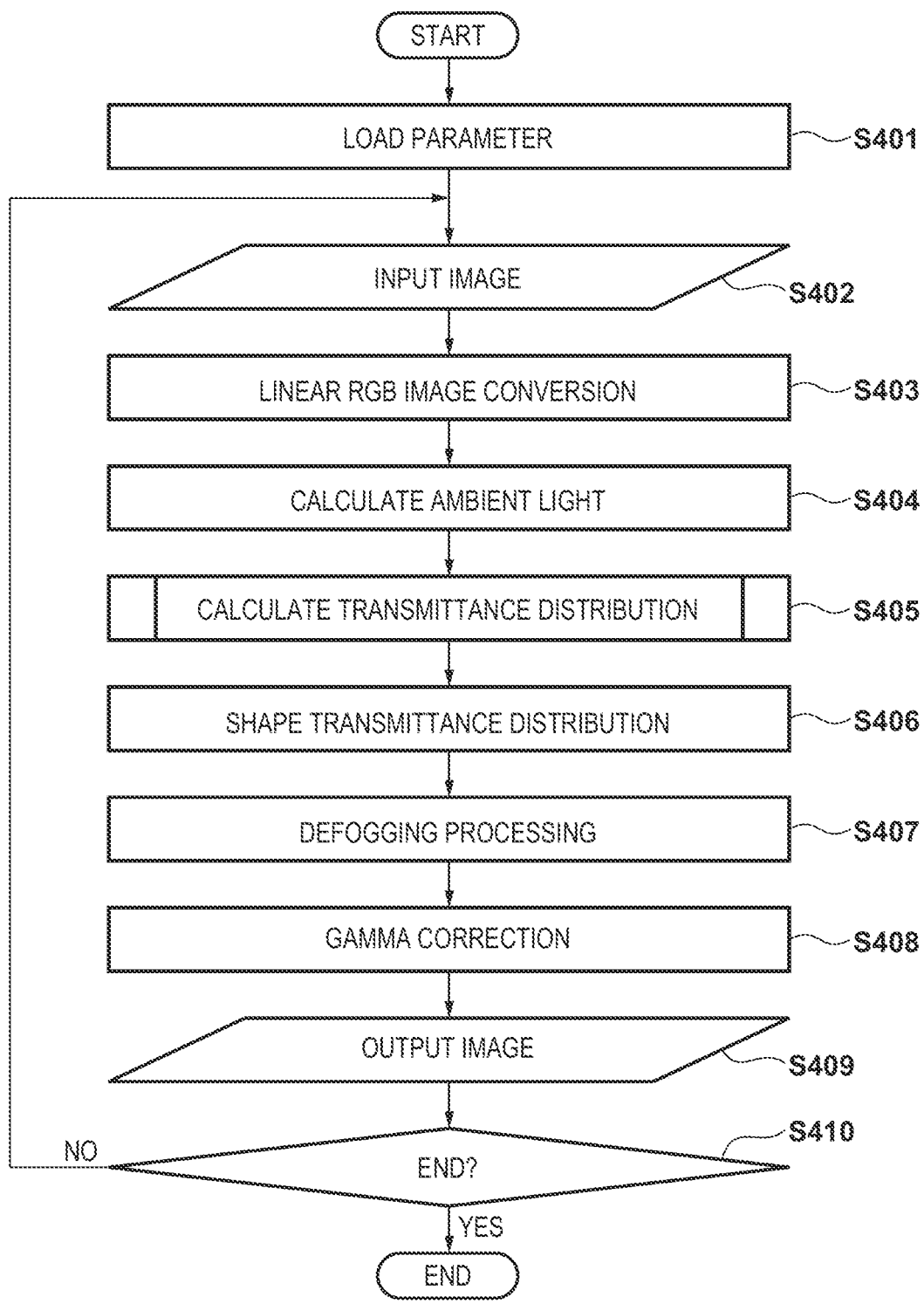

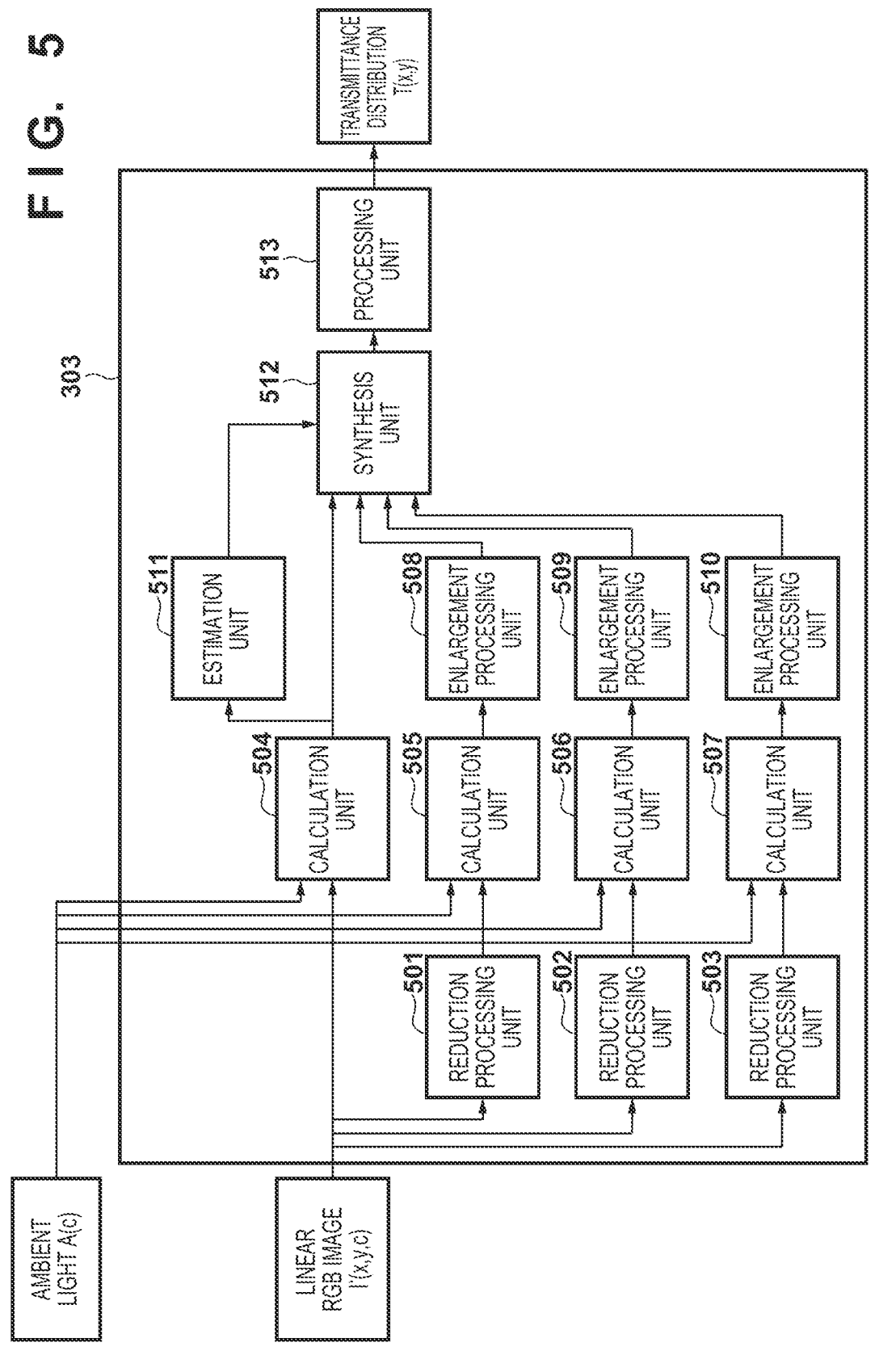
F I G. 5

F I G.  7
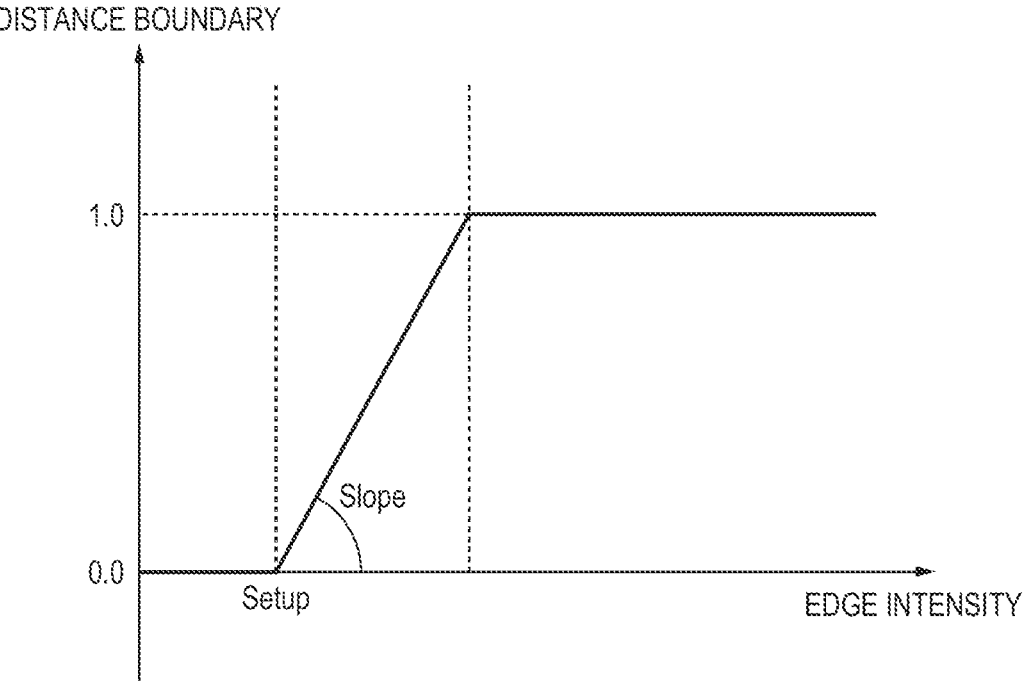

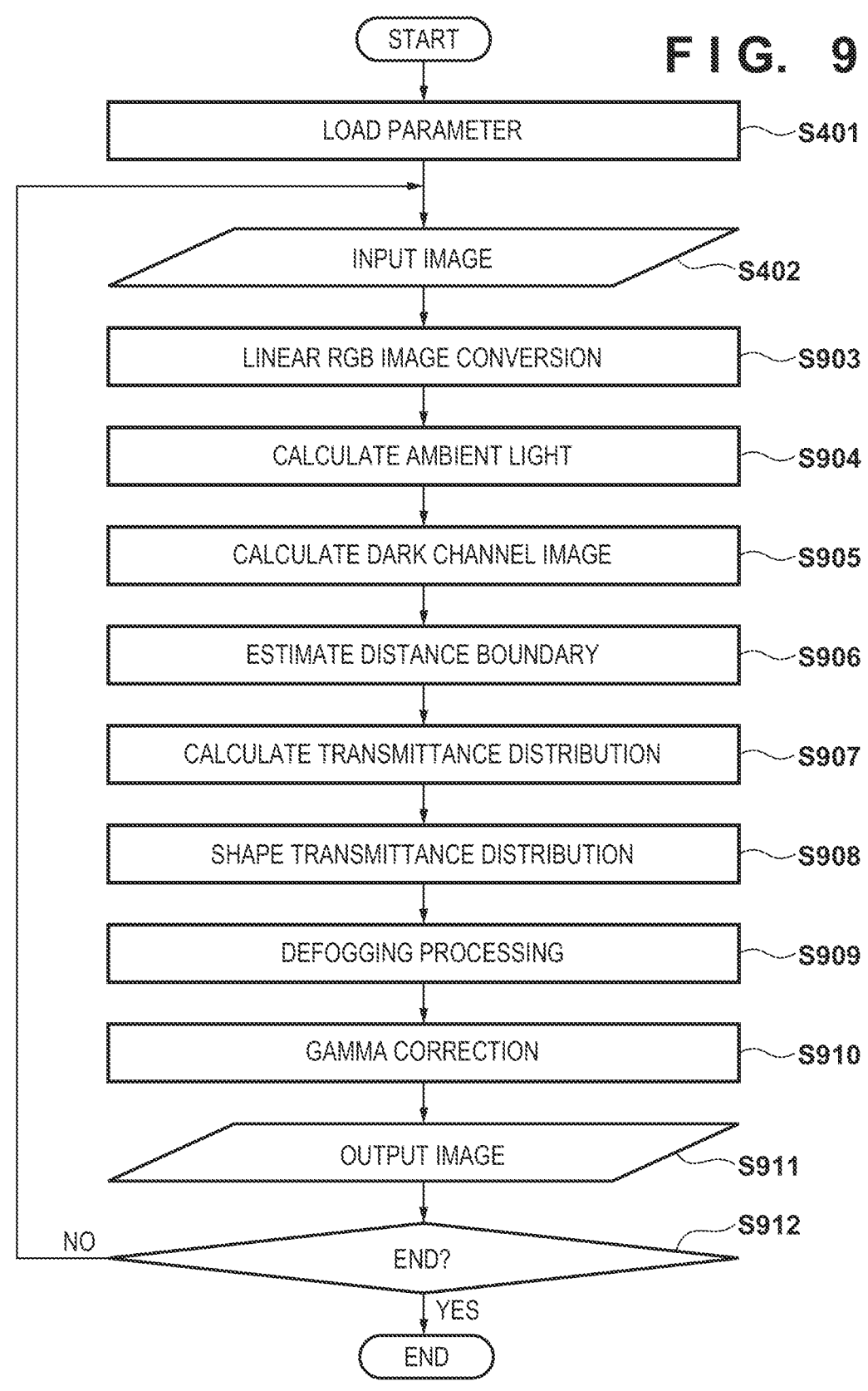
F I G. 9

F I G. 10
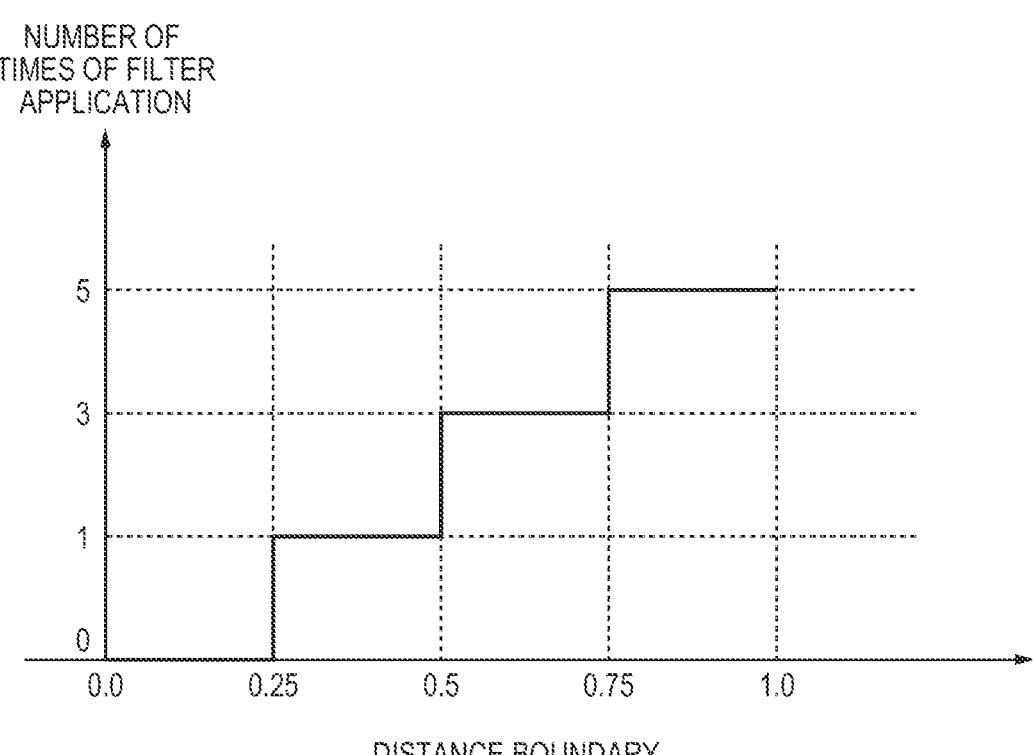

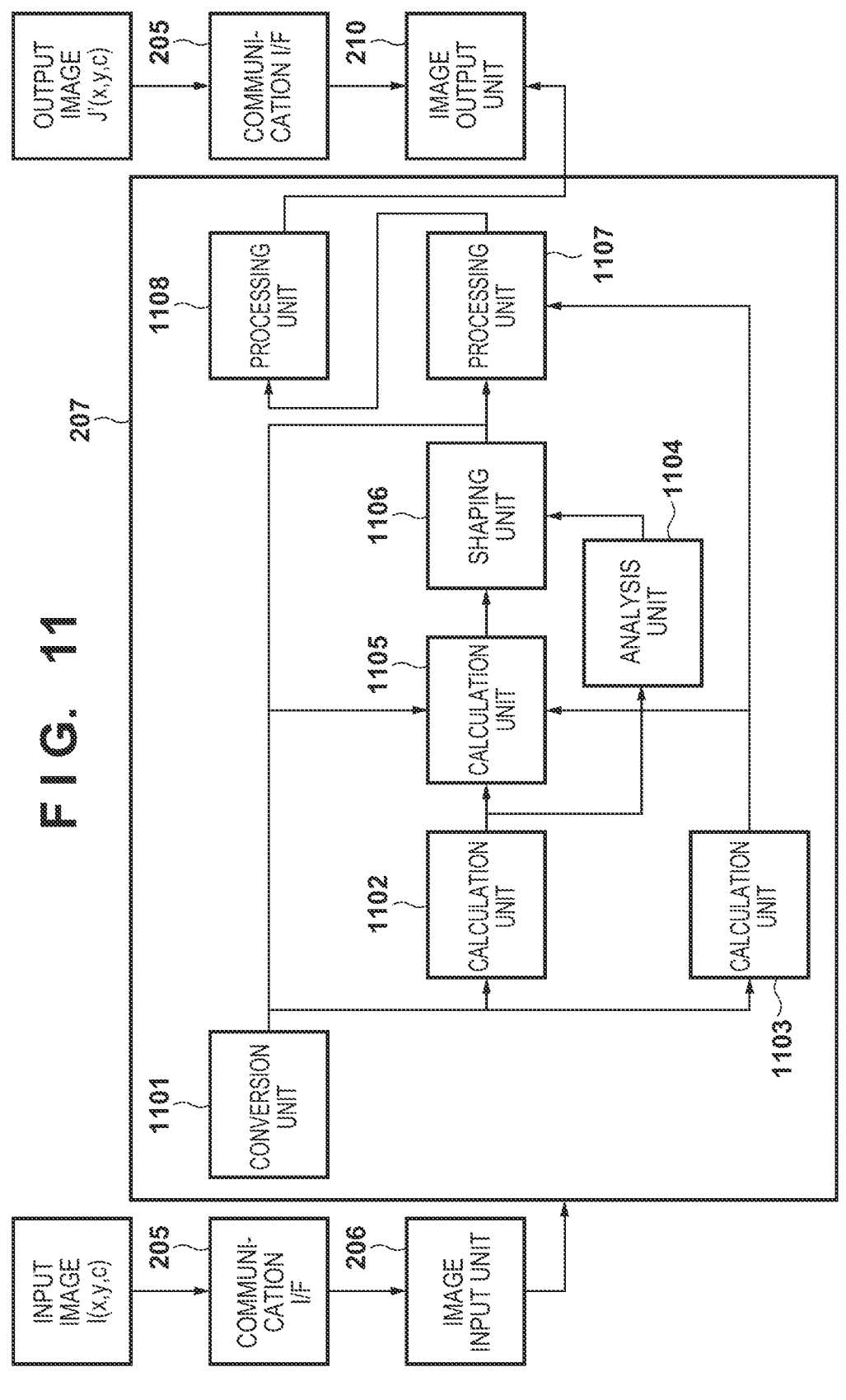
F I G. 11

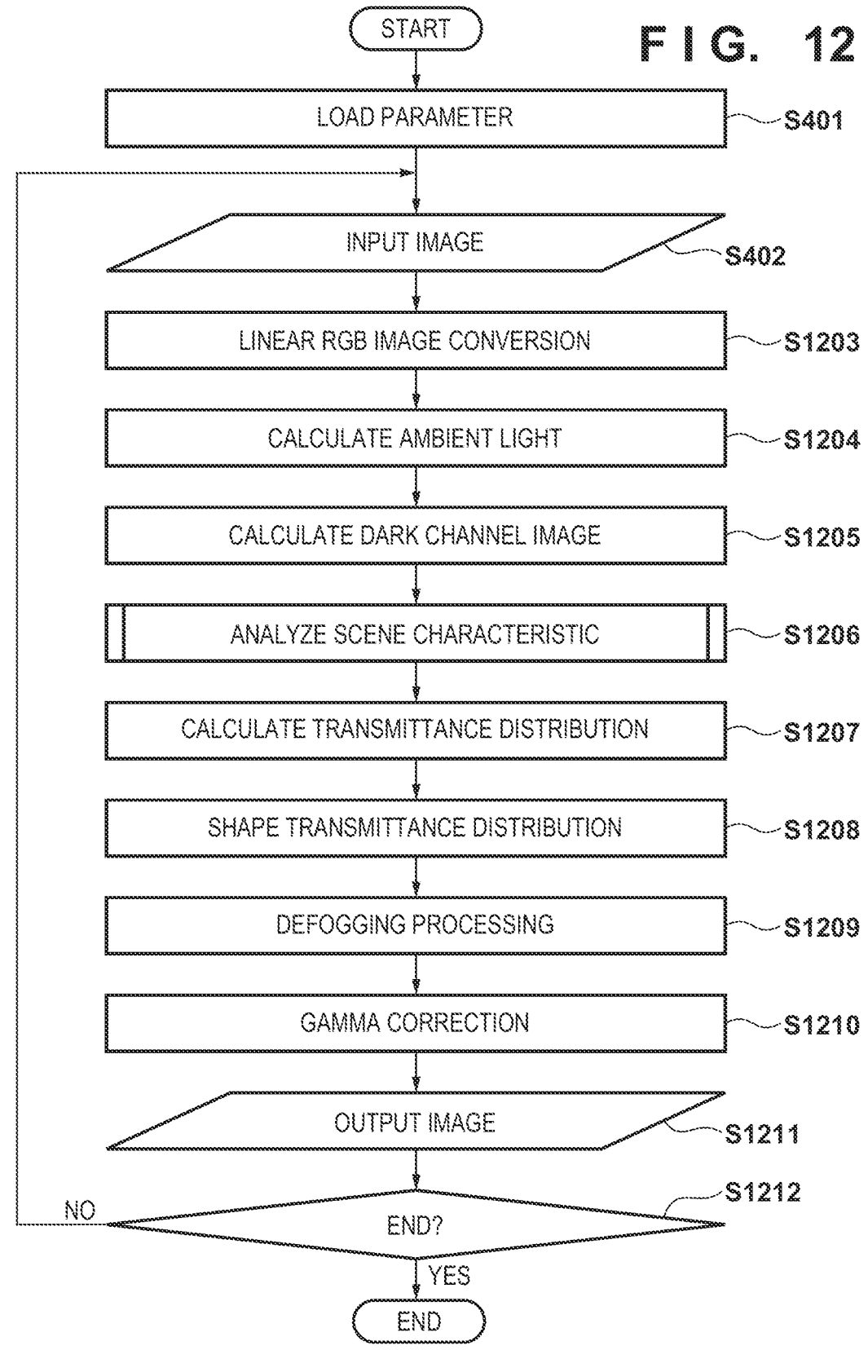
F I G. 12

FIG. 14

F I G. 15
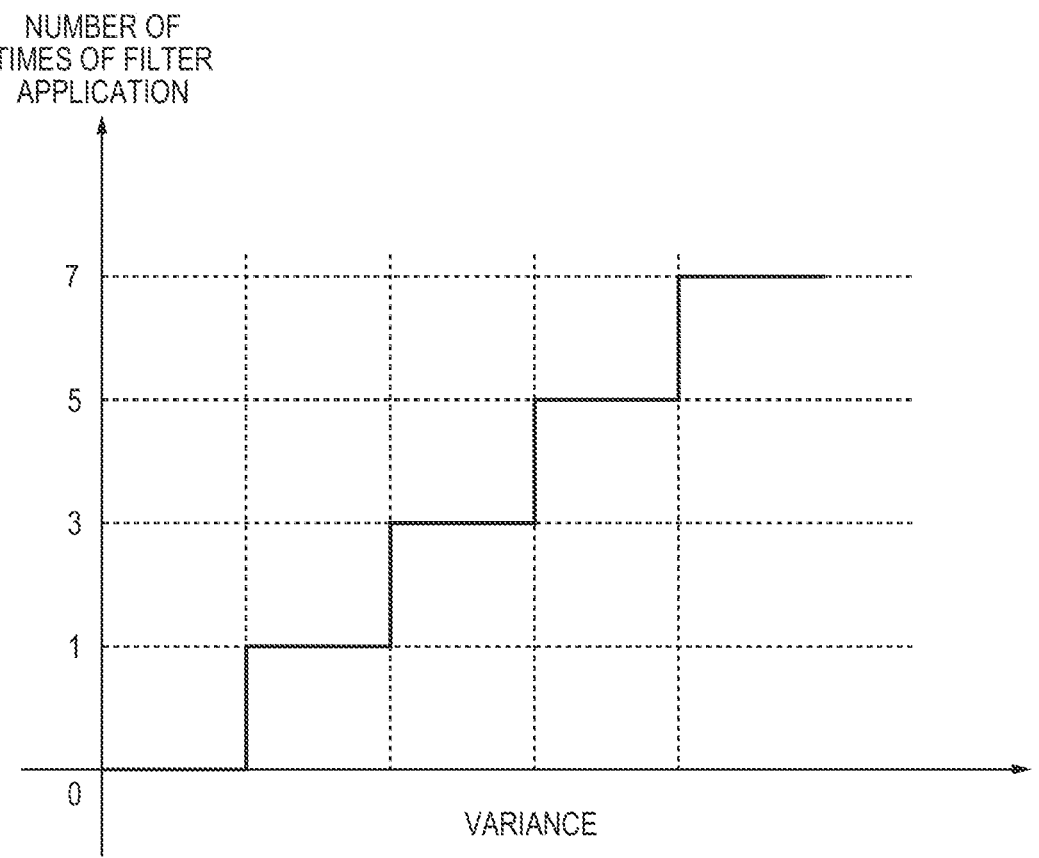

IMAGE PROCESSING APPARATUS, IMAGE PROCESSING METHOD, AND NON-TRANSITORY COMPUTER-READABLE STORAGE MEDIUM

CROSS-REFERENCE TO PRIORITY APPLICATION

This application claims the benefit of Japanese Patent Application No. 2022-188699, filed Nov. 25, 2022, which is hereby incorporated by reference herein in its entirety.

BACKGROUND OF THE INVENTION

Field of the Invention

The present invention relates to a technology for correcting contrast in an input image.

Description of the Related Art

In the field of monitoring cameras and in-vehicle cameras, there is a problem that visibility of a captured image is reduced due to an influence of fog, or the like, existing between the camera and a subject. This is because light is scattered by microparticle components when light passes through the atmosphere, so that the contrast of the captured image is reduced. In this phenomenon, the scattering degree varies depending on the distance to the subject, and thus, in a case of a scene having various distances to the subjects, images have different reduction degrees of contrast for each local region of the image. As a technique for correcting such contrast reduction, there is a technique such as He et al., Single Image Haze Removal Using Dark Channel Prior, IEEE Transactions on Pattern Analysis and Machine Intelligence, Sep. 9, 2010, pp. 2341 to 2353, vol. 33, Issue: 12, IEEE. In He et al., Single Image Haze Removal Using Dark Channel Prior, IEEE Transactions on Pattern Analysis and Machine Intelligence, Sep. 9, 2010, pp. 2341 to 2353, vol. 33, Issue: 12, IEEE., it is assumed that black floating occurs due to the influence of fog or the like, and the transmittance distribution of the atmosphere is estimated from the color channel minimum pixel value (hereinafter, dark channel) in a region, and the influence of fog is removed based on an atmosphere model (hereinafter, defog). In Qiyuan Liang, City University of Hong Kong, "PYRAMID FUSION DARK CHANNEL PRIOR FOR SINGLE IMAGE DEHAZING", Computer Vision and Pattern Recognition, arXiv: 2105.10192, by hierarchically synthesizing the transmittance distribution, an image quality negative effect (hereafter, halo) that the periphery of the subject becomes white due to insufficient correction is reduced, and visibility is improved.

However, in the technique of He et al., Single Image Haze Removal Using Dark Channel Prior, IEEE Transactions on Pattern Analysis and Machine Intelligence, Sep. 9, 2010, pp. 2341 to 2353, vol. 33, Issue: 12, IEEE., a halo occurs in a region where the estimation result of the transmittance distribution by the dark channel is determined to be lower than an actual value. In the technique of Qiyuan Liang, City University of Hong Kong, "PYRAMID FUSION DARK CHANNEL PRIOR FOR SINGLE IMAGE DEHAZING", Computer Vision and Pattern Recognition, arXiv: 2105.10192, the region where a halo is likely to occur differs for each pixel, but the transmittance distribution is synthesized at a constant ratio in all pixels, and therefore the reduction effect of the halo is lowered.

SUMMARY OF THE INVENTION

The present invention provides a technology for reducing a halo.

According to a first aspect of the present invention, an image processing apparatus comprises a calculation unit configured to calculate ambient light based on an input image, a first generation unit configured to generate a dark channel image having a minimum value of a color channel of a local region in the input image as a pixel value based on the input image and the ambient light, and to generate a transmittance distribution of atmosphere based on the dark channel image, a shaping unit configured to perform processing of shaping the transmittance distribution a plurality of times, and a second generation unit configured to generate a corrected image in which contrast of the input image is corrected based on a shaped transmittance distribution shaped by the shaping unit and the ambient light.

According to a second aspect of the present invention, an image processing method comprises calculating ambient light based on an input image, generating a dark channel image having a minimum value of a color channel of a local region in the input image as a pixel value based on the input image and the ambient light, and to generate a transmittance distribution of atmosphere based on the dark channel image, performing processing of shaping the transmittance distribution a plurality of times, and generating a corrected image in which contrast of the input image is corrected based on a shaped transmittance distribution and the ambient light.

According to a third aspect of the present invention, a non-transitory computer-readable storage medium storing a computer program for causing a computer to function as a calculation unit configured to calculate ambient light based on an input image, a first generation unit configured to generate a dark channel image having a minimum value of a color channel of a local region in the input image as a pixel value based on the input image and the ambient light, and to generate a transmittance distribution of atmosphere based on the dark channel image, a shaping unit configured to perform processing of shaping the transmittance distribution a plurality of times, and a second generation unit configured to generate a corrected image in which contrast of the input image is corrected based on a shaped transmittance distribution shaped by the shaping unit and the ambient light.

Further features of the present invention will become apparent from the following description of exemplary embodiments with reference to the attached drawings.

BRIEF DESCRIPTION OF THE DRAWINGS

FIG. 3 is a block diagram illustrating a functional configuration example of an image processing unit 207.

FIG. 4 is a flowchart of processing performed by the image processing apparatus 100.

FIG. 5 is a block diagram illustrating a functional configuration example of a calculation unit 303.

FIG. 7 is a diagram illustrating a relationship between edge intensity and a distance boundary.

FIG. 9 is a flowchart of processing performed by the image processing apparatus 100.

FIG. 10 is a diagram illustrating a relationship between a distance boundary and the number of times of filter application.

FIG. 11 is a block diagram illustrating a functional configuration example of the image processing unit 207.

FIG. 12 is a flowchart of processing performed by the image processing apparatus 100.

FIG. 14 is a block diagram illustrating a functional configuration example of the analysis unit 1104.

FIG. 15 is a diagram illustrating a relationship between a variance v and a number N of times of filter application.

DESCRIPTION OF THE EMBODIMENTS

Figure 1:
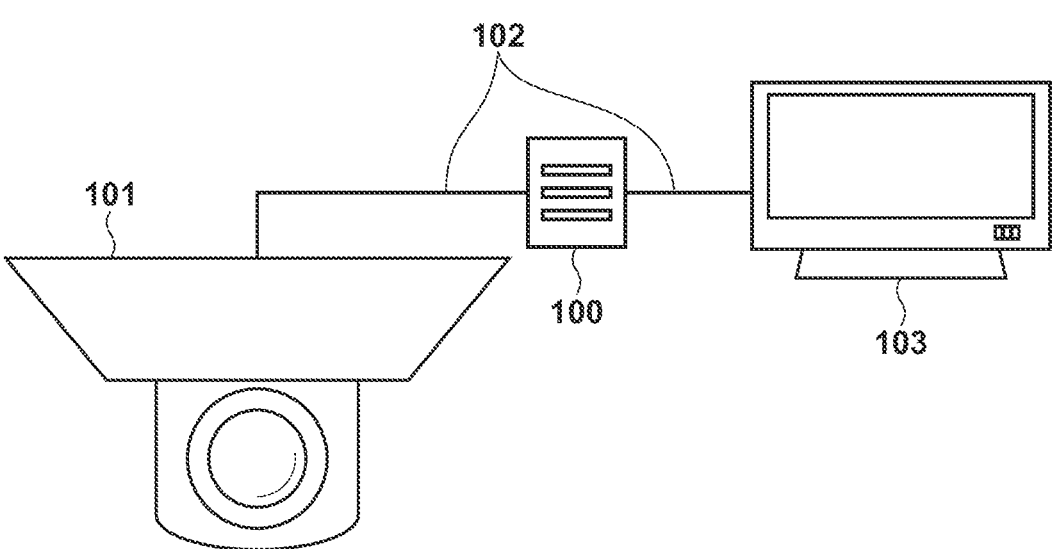
FIG. 1 is a diagram illustrating a configuration example of a system.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

First Embodiment

In the present embodiment, "dark channel images having different resolutions (images having a minimum value of a color channel in a local region in an input image as a pixel value)" generated based on the input image is synthesized based on a distance boundary estimated based on the dark channel image, and the transmittance distribution of the atmosphere is obtained based on a result of the synthesis. Then, the transmittance distribution is shaped by repeatedly applying a joint bilateral filter to the transmittance distribution, and a corrected image (corrected image in which the halo generated at the distance boundary is reduced) in which the contrast of the input image is corrected is generated using the shaped transmittance distribution.

First, a configuration example of a system according to the present embodiment will be described with reference to FIG. 1. As illustrated in FIG. 1, the system according to the present embodiment includes a camera 101, the image processing apparatus 100, and a display 103. The camera 101 and the image processing apparatus 100, and the image processing apparatus 100 and the display 103 are communicably connected to each other via a video transmission cable 102 such as an HDMI (registered trademark) or a serial digital interface (SDI) cable. Note that a connection method between the camera 101 and the image processing apparatus 100 and between the image processing apparatus 100 and the display 103 is not limited to a specific connection method.

First, the camera 101 will be described. The camera 101 is an example of an image-capturing apparatus that can control its own pan, tilt, and zoom in response to an instruction from the image processing apparatus 100 or independently, and captures a moving image or a still image. When capturing a moving image, the camera 101 outputs an image of each frame in the moving image as a captured image, and when capturing a still image, the camera outputs a still image captured regularly or irregularly as a captured image. The captured image output from the camera 101 is input as an input image to the image processing apparatus 100 via the video transmission cable 102. The captured image output from the camera 101 may be output to the display 103 via a communication path not illustrated to display the captured image on the display 103.

The display 103 will be described next. The display 103 includes a liquid crystal screen or a touch screen, and displays images and characters output from the image processing apparatus 100. When the display 103 includes a touch screen, an operation input from the user to the touch screen is notified to the image processing apparatus 100 via a communication path not illustrated.

Figure 2:
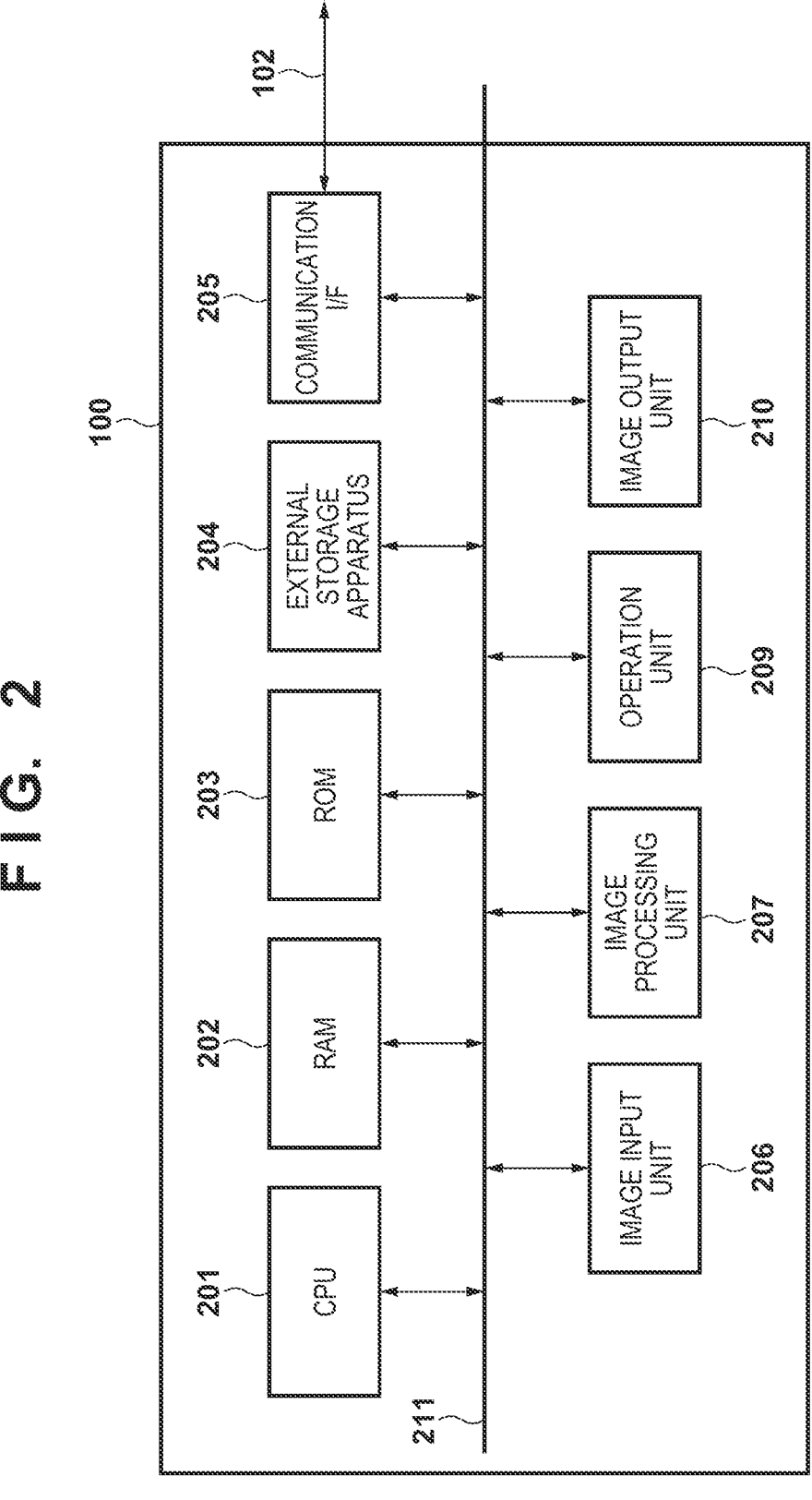
FIG. 2 is a block diagram illustrating a hardware configuration example of an image processing apparatus 100.

The image processing apparatus 100 will be described next. The image processing apparatus 100 is a computer apparatus such as a personal computer (PC), a smartphone, or a tablet terminal apparatus. A hardware configuration example of the image processing apparatus 100 will be described with reference to the block diagram of FIG. 2.

A CPU 201 executes various types of processing using computer programs and data stored in a RAM 202. Due to this, the CPU 201 performs overall operation control of the image processing apparatus 100, and executes or controls various types of processing described as processing performed by the image processing apparatus 100.

The RAM 202 includes an area for storing computer programs and data loaded from the ROM 203 and an external storage apparatus 204, and an area for storing input images acquired by an image input unit 206 from the camera 101 via a communication I/F 205. Furthermore, the RAM 202 includes a work area used when the CPU 201 or the image processing unit 207 executes various types of processing. As such, the RAM 202 can provide various types of areas as appropriate.

The ROM 203 stores setting data of the image processing apparatus 100, a computer program and data related to startup of the image processing apparatus 100, a computer program and data related to basic operation of the image processing apparatus 100, and the like.

The external storage apparatus 204 is a large-capacity information storage apparatus such as a hard disk drive apparatus. The external storage apparatus 204 saves an operating system (OS), computer programs and data for causing the CPU 201 and the image processing unit 207 to execute or to control various types of processing described as processing performed by the image processing apparatus 100, and the like. Computer programs and data saved in the external storage apparatus 204 are appropriately loaded into the RAM 202 under the control of the CPU 201, and become processing targets by the CPU 201 and the image processing unit 207.

In addition to the external storage apparatus 204, the image processing apparatus 100 may include an apparatus that reads and writes computer programs and data from and to storage media such as an SSD, an SD card, and a USB memory.

The communication I/F 205 is an interface such as HDMI or an SDI, and is an interface for performing data communication with the camera 101 and the display 103 via the video transmission cable 102.

The image input unit 206 acquires a captured image output from the camera 101 via the video transmission cable 102 as an input image, and stores/saves the acquired input image into the RAM 202 or the external storage apparatus 204. The image processing unit 207 is a hardware circuit for image processing.

An operation unit 209 is a user interface such as a keyboard, a mouse, and a touchscreen, and can input various instructions to the CPU 201 by being operated by the user. An image output unit 210 outputs an image processed by the image processing apparatus 100 to the display 103 via the communication I/F 205.

The CPU 201, the RAM 202, the ROM 203, the external storage apparatus 204, the communication I/F 205, the image input unit 206, the image processing unit 207, the operation unit 209, and the image output unit 210 are all connected to a system bus 211.

Figure 3:
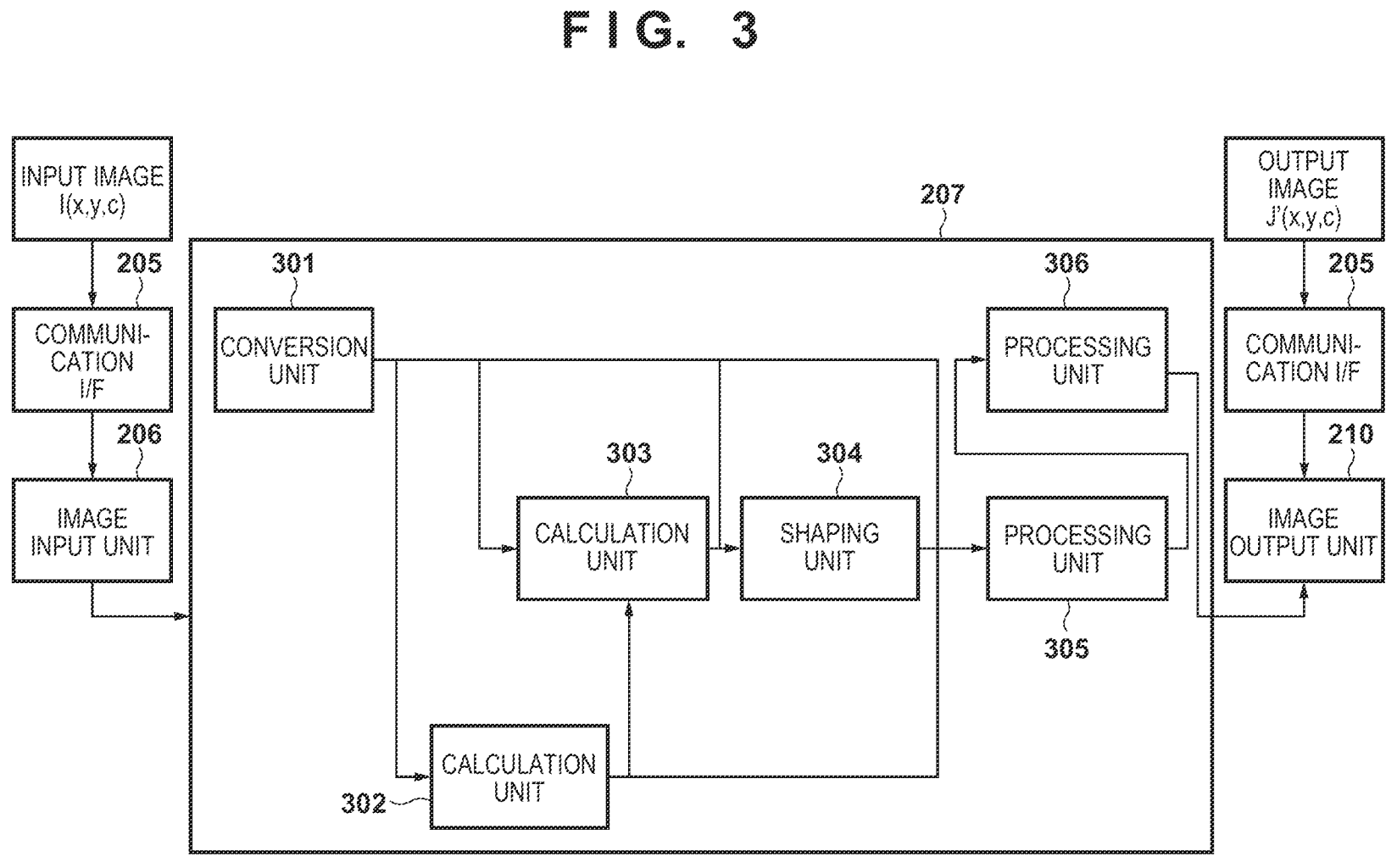

A functional configuration example of the image processing unit 207 is illustrated in the block diagram of FIG. 3. Hereafter, the description assumes that all the functional units illustrated in FIG. 3 are implemented by hardware. However, one or more functional units of the functional units illustrated in FIG. 3 may be implemented by software (computer program), and, in this case, the functions of the one or more functional units are implemented by the CPU 201 executing a computer program corresponding to the one or more functional units.

The processing performed by the image processing apparatus 100 to generate a corrected image, in which contrast of an input image acquired from the camera 101 is corrected, will be described with reference to the flowchart of FIG. 4.

In step S401, the CPU 201 loads, into the RAM 202, the "various types of parameters to be used in subsequent processing" stored/saved in the ROM 203 or the external storage apparatus 204.

In step S402, the image input unit 206 acquires, as an input image I via the communication I/F 205, the captured image output from the camera 101 via the video transmission cable 102, and inputs the acquired input image I into the image processing unit 207. Here, I (x, y, c) represents the pixel value of a color channel c of the pixel at a pixel position (x, y) in the input image I. Here, c=R, G, and B.

In step S403, a conversion unit 301 converts the input image I into a linear RGB image I' exhibiting linear characteristics with respect to luminance. Here, I' (x, y, c) represents the pixel value of the color channel c of the pixel at the pixel position (x, y) in the linear RGB image I'.

In step S404, a calculation unit 302 calculates ambient light A(c) of the color channel c using the linear RGB image I'. The ambient light is a component of light in which light from the sun, the sky, or the like, is scattered by fog. Here, A(c) is a component of light corresponding to the color channel c. A method of calculating ambient light from an image is known, and the ambient light can be calculated using a method described in, for example, He et al., Single Image Haze Removal Using Dark Channel Prior, IEEE Transactions on Pattern Analysis and Machine Intelligence, Sep. 9, 2010, pp. 2341 to 2353, vol. 33, Issue: 12, IEEE.

In step S405, the calculation unit 303 calculates a transmittance distribution T of atmosphere using the linear RGB image I' and the ambient light A(c). Here, T (x, y) represents the transmittance of atmosphere corresponding to a pixel position (x, y) in the input image I (linear RGB image I'). Details of the processing in step S405 will be described later.

In step S406, a shaping unit 304 performs shaping processing for reducing a search range shape on the transmittance distribution T calculated in step S405 to generate a shaped transmittance distribution T'. Here, T' (x, y) represents the transmittance of atmosphere corresponding to the pixel position (x, y) in the input image I (linear RGB image I'). Details of the processing in step S406 will be described later.

In step S407, a processing unit 305 performs defogging processing on the linear RGB image I' by performing processing according to the following (Formula 1) using the ambient light A(c) and the shaped transmittance distribution T', and generates a defog image J.

[Equation 1]

$$J(x, y, c) = \frac{I'(x, y, c) - A(c)}{\min(t_{min}, T'(x, y))} + A(c) \qquad \text{(Formula 1)}$$

Here, J (x, y, c) represents the pixel value of the color channel c of the pixel at the pixel position (x, y) in the defog image J. In addition, $t_{min}$ is a prescribed coefficient for preventing zero division, and in the present embodiment, $t_{min}$=0.1.

In step S408, a processing unit 306 performs gamma correction on the defog image J generated in step S407 to generate an output image J'. In step S409, the image output unit 210 outputs the output image J' generated in step S408 to the display 103 via the communication I/F 205.

In step S410, the CPU 201 determines whether or not an end condition of processing is satisfied. Various conditions can be applied as the end condition of processing. For example, the end conditions of processing include "it is detected that the power of the camera 101 is turned off", "the length of the period in which an input image is not acquired from the camera 101 has become equal to or greater than a certain period length", and "it is detected that the user operates the operation unit 209 to input a processing end instruction".

As a result of such determination, when the end condition of the processing is satisfied, the processing according to the flowchart of FIG. 4 ends, and when the end condition of the processing is not satisfied, the processing proceeds to step S402.

Figure 6:
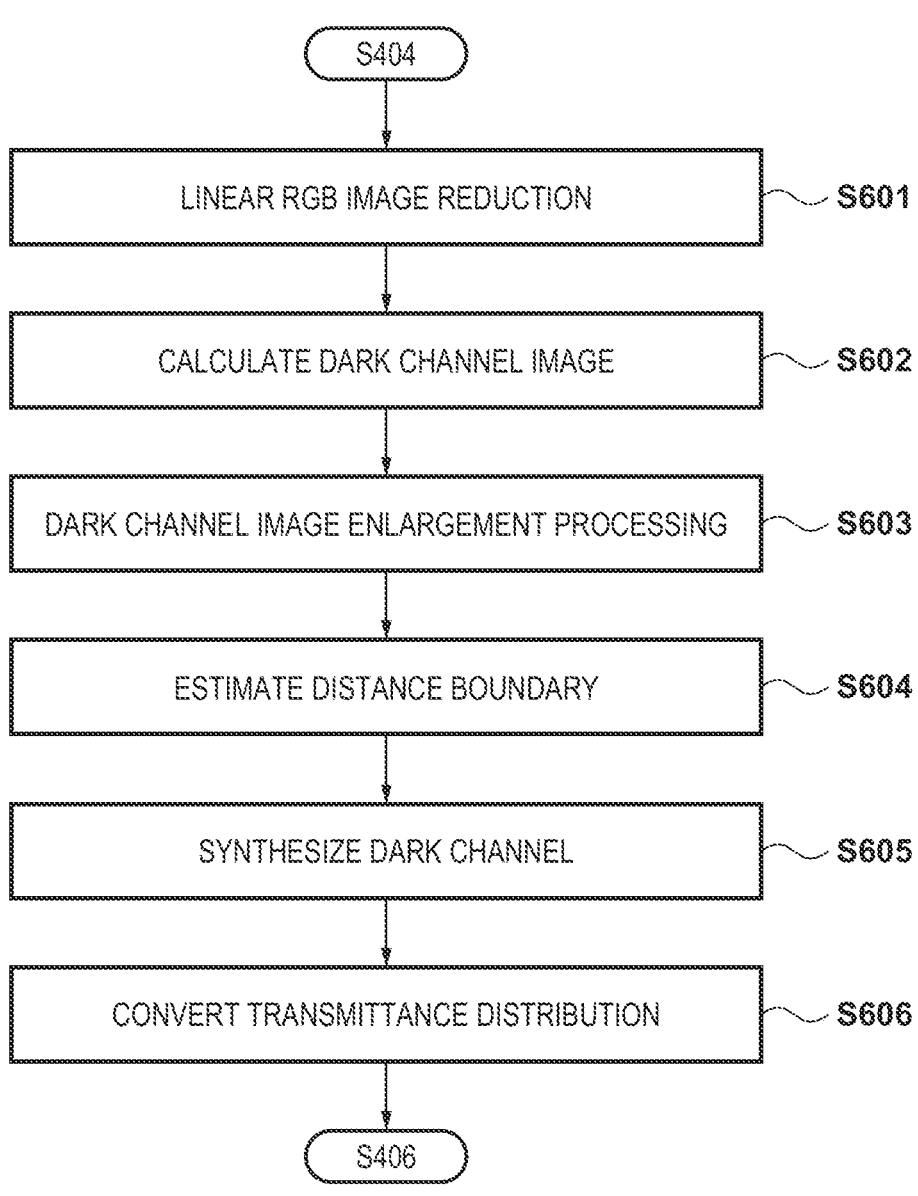
FIG. 6 is a flowchart of processing performed by the calculation unit 303.

Details of the processing in step S405 described above will be described next. A functional configuration example of the calculation unit 303 is illustrated in the block diagram of FIG. 5. The processing (processing of step S405) performed by the calculation unit 303 having the functional configuration example illustrated in FIG. 5 will be described with reference to the flowchart of FIG. 6.

In step S601, a reduction processing unit 501 generates a reduced image I2 in which the vertical and horizontal sizes of the linear RGB image I' are reduced by one half. Here, I2 (x, y, c) represents the pixel value of the color channel c of the pixel at the pixel position (x, y) in the reduced image I2.

A reduction processing unit 502 generates a reduced image I3 in which the vertical and horizontal sizes of the linear RGB image I' are reduced by ¼. Here, I3 (x, y, c) represents the pixel value of the color channel c of the pixel at the pixel position (x, y) in the reduced image I3.

A reduction processing unit 503 generates a reduced image I4 in which the vertical and horizontal sizes of the linear RGB image I' are reduced by ⅛. Here, I4 (x, y, c) represents the pixel value of the color channel c of the pixel at the pixel position (x, y) in the reduced image I4.

The method adopted by the reduction processing units 501, 502, and 503 for generating reduced images from the linear RGB image I' is not limited to a specific method, and, for example, a nearest-neighbor method or a bilinear method is used.

A calculation unit 504 generates a dark channel image d1 by performing arithmetic processing according to the following (Formula 2) using the linear RGB image I' and the ambient light A(c). Here, d1 (x, y) represents a pixel value of a pixel at the pixel position (x, y) in the dark channel image d1.

A calculation unit 505 generates a dark channel image d2 by performing arithmetic processing according to the following (Formula 2) using the reduced image I2 and the ambient light A(c). Here, d2 (x, y) represents a pixel value of a pixel at the pixel position (x, y) in the dark channel image d2.

A calculation unit 506 generates a dark channel image d3 by performing arithmetic processing according to the following (Formula 2) using the reduced image I3 and the ambient light A(c). Here, d3 (x, y) represents a pixel value of a pixel at the pixel position (x, y) in the dark channel image d3.

A calculation unit 507 generates a dark channel image d4 by performing arithmetic processing according to the following (Formula 2) using the reduced image I4 and the ambient light A(c). Here, d4 (x, y) represents a pixel value of a pixel at the pixel position (x, y) in the dark channel image d4.

[Equation 2]

$$d1(x, y) = \min_{c \in \{r,g,b\}} \left( \min_{x,y \in \Omega(h,v)} \left( \frac{I'(x, y, c)}{A(c)} \right) \right)$$ (Formula 2)

$$d2(x, y) = \min_{c \in \{r,g,b\}} \left( \min_{x,y \in \Omega(h,v)} \left( \frac{I2(x, y, c)}{A(c)} \right) \right)$$

$$d3(x, y) = \min_{c \in \{r,g,b\}} \left( \min_{x,y \in \Omega(h,v)} \left( \frac{I3(x, y, c)}{A(c)} \right) \right)$$

$$d4(x, y) = \min_{c \in \{r,g,b\}} \left( \min_{x,y \in \Omega(h,v)} \left( \frac{I4(x, y, c)}{A(c)} \right) \right)$$

Here, $\Omega$ (h, v) is a rectangular local region for calculating a dark channel image, and h and v are rectangular ranges. In the present embodiment, the minimum values of R, G, and B are calculated for the region of h=3 and v=3 around a focused pixel, and the pixel value at the focused pixel position is replaced.

In step S603, an enlargement processing unit 508 obtains an enlarged image d2' in which the vertical and horizontal sizes of the dark channel image d2 are enlarged twofold. Hereafter, the enlarged image d2' is referred to as the dark channel image d2.

An enlargement processing unit 509 obtains an enlarged image d3' in which the vertical and horizontal sizes of the dark channel image d3 are enlarged by fourfold. Hereafter, the enlarged image d3' is referred to as the dark channel image d3.

Furthermore, the enlargement processing unit 510 obtains an enlarged image d4' in which the vertical and horizontal sizes of the dark channel image d4 are enlarged by eightfold. Hereafter, the enlarged image d4' is referred to as the dark channel image d4.

The method adopted by the enlargement processing units 508, 509, and 510 for enlarging dark channel images is not limited to a specific method, and, for example, a nearest-neighbor method or a bilinear method is used.

In step S604, an estimation unit 511 estimates a distance boundary. The distance boundary is a boundary surface of subjects having different distances. In general, the distance boundary cannot be calculated unless the distance to the subject is known. However, He et al., Single Image Haze Removal Using Dark Channel Prior, IEEE Transactions on Pattern Analysis and Machine Intelligence, Sep. 9, 2010, pp. 2341 to 2353, vol. 33, Issue: 12, IEEE. indicates a presence of a correlation between the distance to the subject and the dark channel in a scene where fog occurs. That is, the distance boundary can be estimated by extracting the edge intensity of the dark channel image.

Therefore, for each pixel in the dark channel image d1, the estimation unit 511 generates an edge intensity image e having, as a pixel value of a pixel, "edge intensity corresponding to the pixel" obtained by applying the Laplacian filter to eight vicinities of the pixel to have an absolute value. Here, e (x, y) represents the pixel value (edge intensity) of the pixel at the pixel position (x, y) in the edge intensity image e. The filter used for generating the edge intensity image is not limited to the Laplacian filter, and for example, a Sobel filter or the like may be used.

Furthermore, the estimation unit 511 generates an edge intensity image e' by enlarging the edge region by applying a maximum value filter to the edge intensity image e. Here, e' (x, y) represents the pixel value (edge intensity) of the pixel at the pixel position (x, y) in the edge intensity image e'.

Then, the estimation unit 511 generates a distance boundary map B corresponding to the edge intensity image e' based on the relationship between the edge intensity and the distance boundary illustrated in FIG. 7. As illustrated in FIG. 7, the estimation unit 511 sets B (x, y)=0.0 in a case when the edge intensity e' (x, y)<threshold Setup, and sets B (x, y)=e' (x, y)×Slope in a case when the edge intensity e' (x, y)≥threshold Setup. The estimation unit 511 corrects B (x, y)=1.0 in a case when B (x, y)>1.0. Here, B (x, y) represents a value (distance boundary) at the position (x, y) of the distance boundary map B. The threshold values Setup and Slope are parameters for conversion control, and are set in step S401.

In step S605, a synthesis unit 512 performs an arithmetic operation according to the following (Formula 3) using the distance boundary map B generated in step S604. Due to this, the synthesis unit 512 generates a synthesized dark channel image D in which the dark channel images d1, d2, d3, and d4 (d2, d3, and d4 are dark channel images enlarged in step S603) are synthesized.

[Equation 3]

$$D(x, y) = \begin{cases} \left(1 - \frac{B(x, y)}{th1}\right) \cdot d4(x, y) + \frac{B(x, y)}{th1} \cdot d3(x, y) [0 \le B(x, y) < th1] \\ \left(1 - \frac{B(x, y) - th1}{th2 - th1}\right) \cdot d3(x, y) + \frac{B(x, y) - th1}{th2 - th1} \cdot d2(x, y) [th1 \le B(x, y) < th1] \\ \left(1 - \frac{B(x, y) - th2}{1 - th2}\right) \cdot d2(x, y) + \frac{B(x, y) - th2}{1 - th2} \cdot d1(x, y) [th2 \le B(x, y) < 1] \end{cases}$$ (Formula 3)

Here, D (x, y) represents a pixel value of a pixel at the pixel position (x, y) in a synthesized dark channel image D. Further, th1 and th2 are parameters for controlling a synthesis degree satisfying 0<th1<th2<1, and are set in step S401.

As shown in (Formula 3), as the distance boundary B (x, y) increases, a dark channel image calculated from a smaller range is used. On the other hand, as B (x, y) decreases, a dark channel image calculated from a larger range is used. This makes it possible to set a dark channel image of an appropriate search range at the distance boundary.

In step S606, the processing unit 513 generates the transmittance distribution T by performing arithmetic processing according to the following (Formula 4) using the synthesized dark channel image D generated in step S605.

[Equation 4]

$$T(x,y)=1.0-\omega \cdot D(x,y) \quad \text{(Formula 4)}$$

Here, $\omega$ is a parameter set within a range of 0.0 to 1.0 (parameter for controlling that the transmittance of a distant subject becomes too large), and is set in step S401.

Details of the processing in step S406 described above will be described next. Since the search range shape remains in the transmittance distribution T, when the defogging processing in step S407 is performed using such the transmittance distribution T, a halo having the search range shape is generated. Therefore, the shaping unit 304 first generates a luminance image Y of the linear RGB image I' using the following (Formula 5).

[Equation 5]

$$Y(x,y)=0.2126*I'(x,y,R)+0.587*I'(x,y,G)+0.114*I'(x,y,B) \quad \text{(Formula 5)}$$

Here, Y (x, y) represents a pixel value (luminance value) of a pixel at the pixel position (x, y) in the luminance image Y. Next, the shaping unit 304 performs processing according to the following (Formula 6), that is, "processing of shaping the transmittance distribution T by repeatedly applying a joint bilateral filter N (N is an integer of 2 or more) times to the transmittance distribution T" using the luminance image Y to generate the shaped transmittance distribution T'.

[Equation 6]

$$\text{for}(i = 0; i < N; i++)\{ \quad \text{(Formula 6)}$$

$$T_{i+1}(x, y) = \frac{1}{W}$$

$$\sum_{m=-h}^{h}\sum_{n=-v}^{v}\exp\left(-\frac{m^2+n^2}{2\sigma_D^2}\right)\exp\left(-\frac{(Y(x, y) - Y(x+m, y+n))^2}{2\sigma_L^2}\right)T_i(x+m, y+n)$$

$$\}$$

$$W = \sum_{m=-h}^{h}\sum_{n=-v}^{v}\exp\left(-\frac{m^2+n^2}{2\sigma_D^2}\right)\exp\left(-\frac{(Y(x, y) - Y(x+m, y+n))^2}{2\sigma_L^2}\right)$$

$$T'(x, y) = T_N(x, y)$$

Here, let T0=T. Further, h and v are processing ranges centered on a processing target pixel, and in the present embodiment, h=v=5 is set. N is the number of times of repeated application of the joint bilateral filter (number of times of filter application), and let N≥2. By setting the number N of times of filter application to be large, the halo reduction effect can be improved. As such, the shaped transmittance distribution T' is generated by performing the shaping processing for reducing the search range shape using the luminance image as a guide image.

In the present embodiment, the processing using the joint bilateral filter has been described as an example of the technique for reducing the halo. However, the filter processing is not limited to specific filter processing as long as the filter processing can be applied repeatedly to separate an edge and a flat part, and filter processing using a filter such as a guided filter, for example, may be used.

As such, according to the present embodiment, it is possible to reduce the halo generated at the distance boundary by repeatedly applying a plurality of times of filter processing (performing a plurality of times of processing of shaping the transmittance distribution) to the transmittance distribution synthesized with the optimum resolution after estimating the distance boundary of the subject.

Second Embodiment

In each of the following embodiments, including the present embodiment, only the difference from the first embodiment will be described, assuming that they are similar to the first embodiment unless otherwise stated. In the first embodiment, a method has been described, the method of calculating the transmittance distribution based on a synthesized dark channel image in which dark channel images corresponding to reduced images of different sizes are synthesized based on the distance boundary, and repeatedly applying a filter a plurality of times. In the present embodiment, a method of applying a filter of the number of times differently for each region based on one dark channel image based on the linear RGB image I' and the distance boundary will be described.

Figure 8:
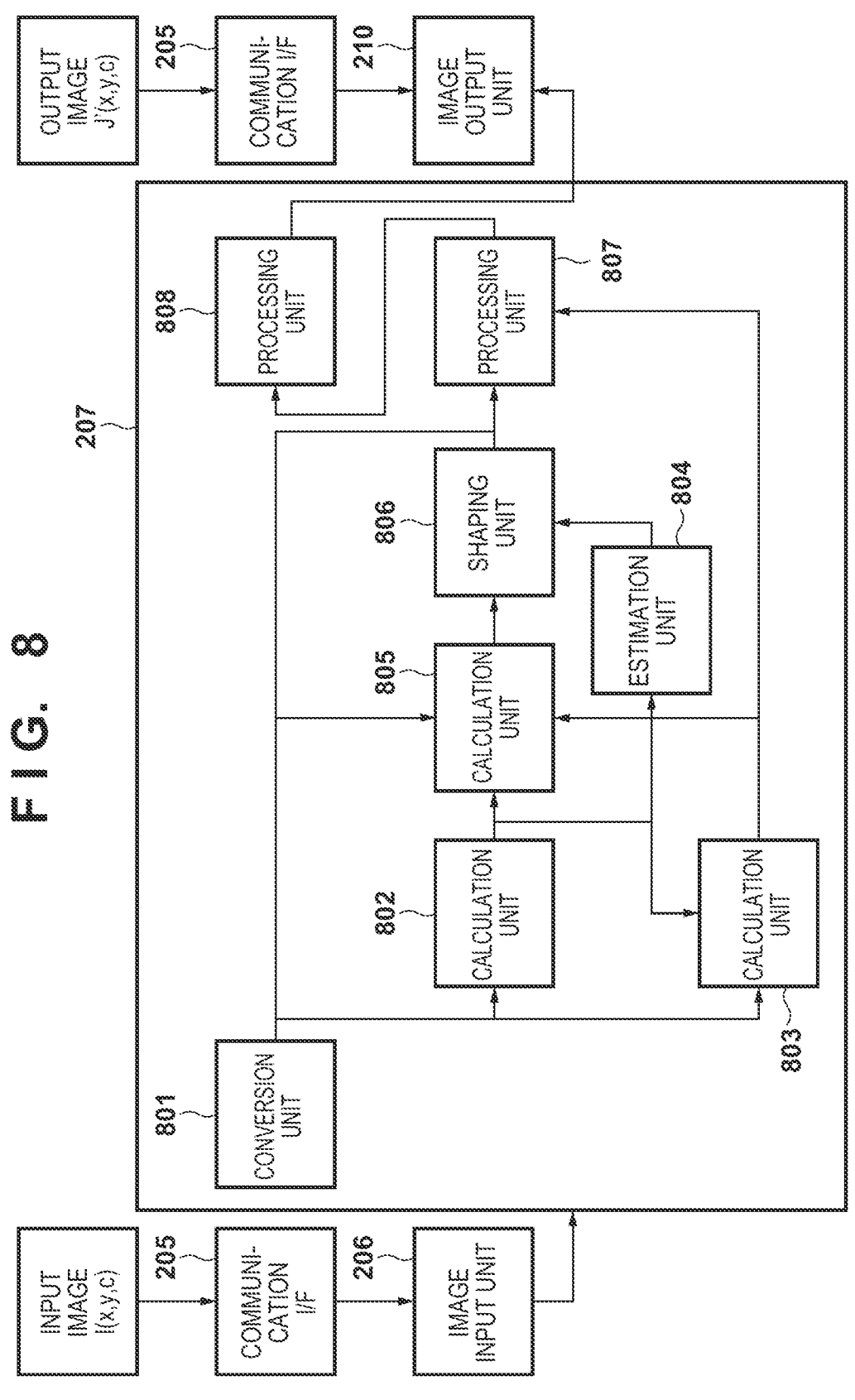
FIG. 8 is a block diagram illustrating a functional configuration example of the image processing unit 207.

A functional configuration example of the image processing unit 207 according to the present embodiment is illustrated in the block diagram of FIG. 8. Hereafter, the description assumes that all the functional units illustrated in FIG. 8 are implemented by hardware. However, one or more functional units of the functional units illustrated in FIG. 8 may be implemented by software (computer program), and, in this case, the functions of the one or more functional units are implemented by the CPU 201 executing a computer program corresponding to the one or more functional units.

The processing performed by the image processing apparatus 100 to generate a corrected image, in which contrast of an input image acquired from the camera 101 is corrected, will be described with reference to the flowchart of FIG. 9. In FIG. 9, the same processing steps as those illustrated in FIG. 4 are denoted by the same step numbers, and the description of the processing steps will be omitted.

In step S903, a conversion unit 801 converts the input image I into the linear RGB image I' similar to step S403 described above. In step S904, similar to step S404 described above, a calculation unit 803 calculates the ambient light A(c) of the color channel c using the linear RGB image I'.

In step S905, similar to step S602 above, a calculation unit 802 generates a dark channel image d by performing arithmetic processing according to (Formula 2) above using the linear RGB image I' and the ambient light A(c).

In step S906, similar to step S604 described above, an estimation unit 804 generates the distance boundary map B from the dark channel image d. In step S907, similar to step S606 described above, a calculation unit 805 generates the transmittance distribution T by performing arithmetic processing according to (Formula 4) using the dark channel image d as D in (Formula 4).

In step S908, a shaping unit 806 shapes the transmittance distribution T using the linear RGB image I' and the distance boundary map B, and generates the shaped transmittance distribution T' in which the block shape is reduced. Also, in the present embodiment, similar to the first embodiment, the shaping unit 806 generates the luminance image Y of the linear RGB image I' according to (Formula 5), and performs the processing according to (Formula 6) above using the luminance image Y to generate the shaped transmittance distribution T'. However, in the present embodiment, the shaping unit 806 determines the number N of times of filter application based on the relationship between the distance boundary and the number of times of filter application presented in FIG. 10.

In the case of FIG. 10, the shaping unit 806 sets the number N of times of filter application=0 when the distance boundary is 0.0 or more and less than 0.25, and sets the number N of times of filter application=1 when the distance boundary is 0.25 or more and less than 0.5. The shaping unit 806 sets the number N of times of filter application=3 when the distance boundary is 0.5 or more and less than 0.75, and sets the number N of times of filter application=5 when the distance boundary is 0.75 or more and less than 1.0. As such, in the present embodiment, the shaped transmittance distribution T' is generated by performing the processing according to (Formula 6) above using the number N of times of filter application according to the distance boundary.

In step S909, similarly to step S407 described above, a processing unit 807 performs the defogging processing on the linear RGB image I' by using the ambient light A(c) and the shaped transmittance distribution T', and generates the defog image J.

In step S910, similarly to step S408 described above, a processing unit 808 performs gamma correction on the defog image J generated in step S909 to generate the output image J'. In step S911, the image output unit 210 outputs the output image J' generated in step S910 to the display 103 via the communication I/F 205.

In step S912, similarly to step S410 described above, the CPU 201 determines whether or not an end condition of processing is satisfied. As a result of such determination, when the end condition of the processing is satisfied, the processing according to the flowchart of FIG. 9 ends, and when the end condition of the processing is not satisfied, the processing proceeds to step S402.

As such, according to the present embodiment, since the number of times of filter application is changed according to the size of the distance boundary, the optimum number of times of filter application can be set for each region. This enables high-speed processing in a region where the distance to the subject is constant and there is no distance boundary.

Third Embodiment

In the second embodiment, the number of times of filter application is set for each region based on the distance boundary map, but, in the present embodiment, the overall optimum number of times of filter application is set according to the distance to the subject of the scene captured by the camera 101 and scene characteristics such as fog.

A functional configuration example of the image processing unit 207 according to the present embodiment is illustrated in the block diagram of FIG. 11. Hereafter, the description assumes that all the functional units illustrated in FIG. 11 are implemented by hardware. However, one or more functional units of the functional units illustrated in FIG. 11 may be implemented by software (computer program), and, in this case, the functions of the one or more functional units are implemented by the CPU 201 executing a computer program corresponding to the one or more functional units.

The processing performed by the image processing apparatus 100 to generate a corrected image in which contrast of an input image acquired from the camera 101 is corrected will be described with reference to the flowchart of FIG. 12. In FIG. 12, the same processing steps as those illustrated in FIG. 4 are denoted by the same step numbers, and the description of the processing steps will be omitted.

In step S1203, a conversion unit 1101 converts the input image I into the linear RGB image I' similar to step S403 described above. In step S1204, similar to step S404 described above, a calculation unit 1103 calculates the ambient light A(c) of the color channel c using the linear RGB image I'.

In step S1205, similar to step S602 above, a calculation unit 1102 generates the dark channel image d by performing arithmetic processing according to (Formula 2) above using the linear RGB image I' and the ambient light A(c).

In step S1206, the analysis unit 1104 analyzes the characteristics of the scene using the dark channel image d generated in step S1205, and calculates the number N of times of filter application according to a result of the analysis. Details of the processing in step S1206 will be described later.

In step S1207, similar to step S606 described above, a calculation unit 1105 generates the transmittance distribution T by performing arithmetic processing according to (Formula 4) using a synthesized dark channel image d as D in (Formula 4).

In step S1208, a shaping unit 1106 shapes the transmittance distribution T using the linear RGB image I', and generates the shaped transmittance distribution T' in which the block shape is reduced. Also, in the present embodiment, the shaping unit 1106 generates the shaped transmittance distribution T' similar to the first embodiment, but applies, as the number N of times of filter application, the number N of times of filter application calculated in step S1206.

In step S1209, similar to step S407 described above, a processing unit 1107 performs the defogging processing on the linear RGB image I' by using the ambient light A(c) and the shaped transmittance distribution T', and generates the defog image J.

In step S1210, similar to step S408 described above, a processing unit 1108 performs gamma correction on the defog image J generated in step S1209 to generate the output image J'. In step S1211, the image output unit 210 outputs the output image J' generated in step S1210 to the display 103 via the communication I/F 205.

In step S1212, similar to step S410 described above, the CPU 201 determines whether or not an end condition of processing is satisfied. As a result of such a determination, when the end condition of the processing is satisfied, the processing according to the flowchart of FIG. 12 ends, and, when the end condition of the processing is not satisfied, the processing proceeds to step S402.

Figure 13:
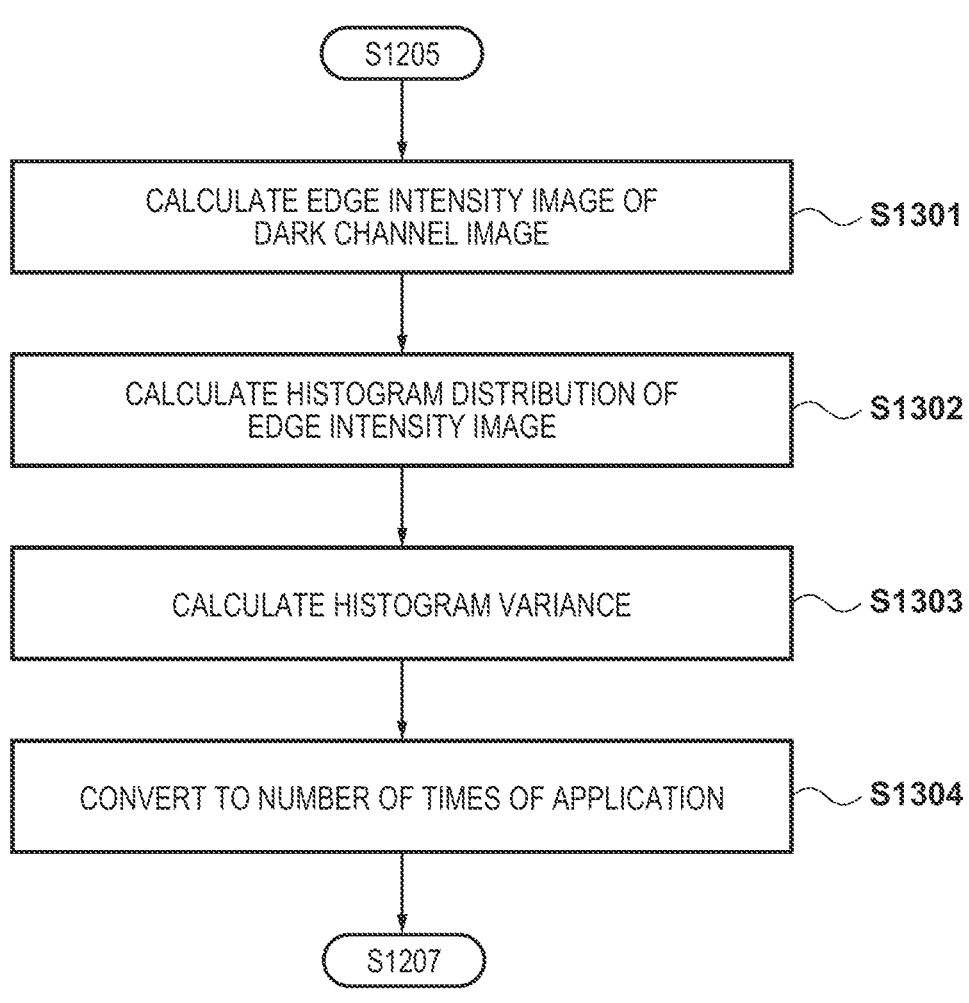
FIG. 13 is a flowchart of processing performed by an analysis unit 1104.
Figure 14:
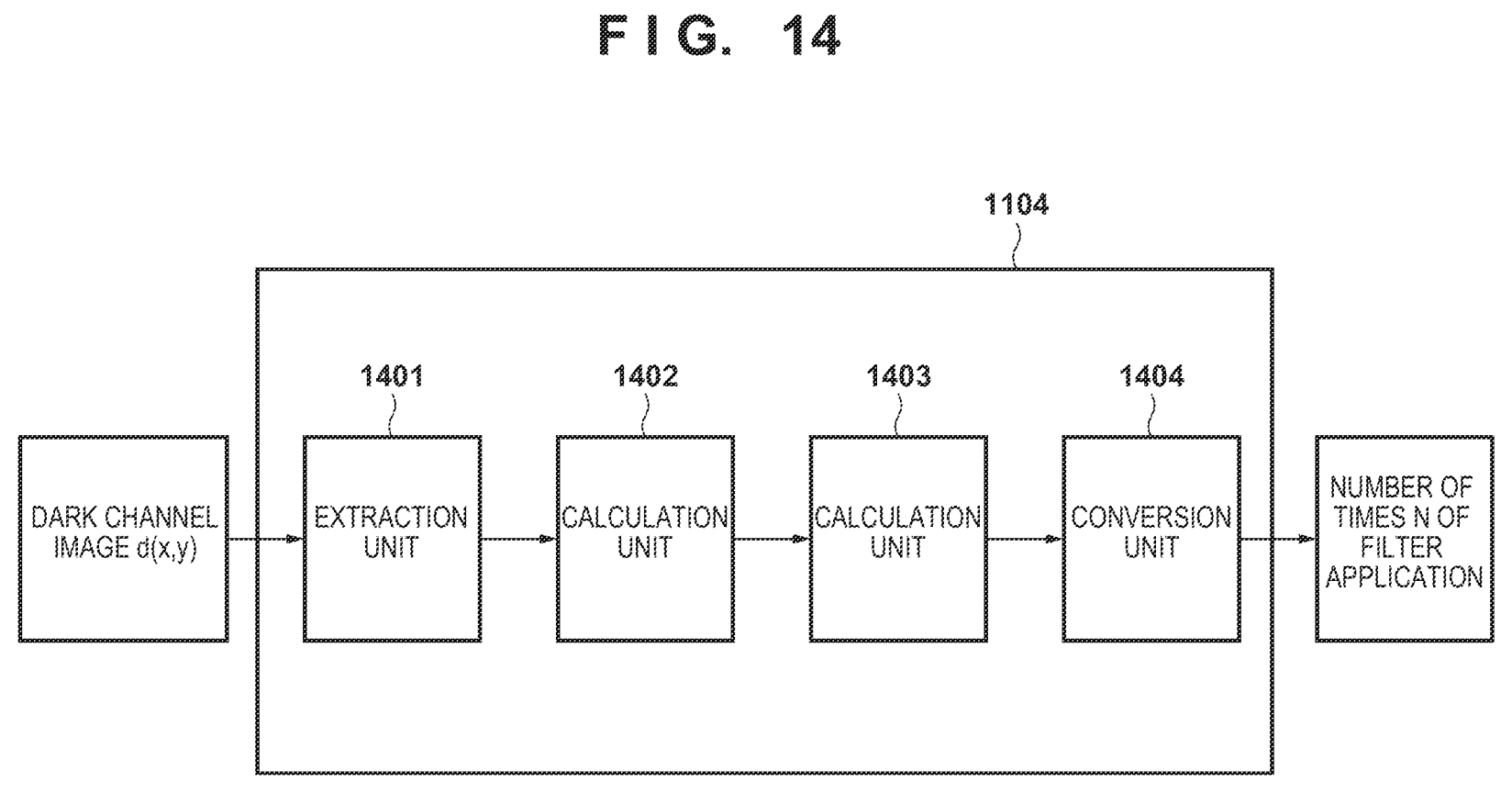

Here, a functional configuration example of the analysis unit 1104 is illustrated in the block diagram of FIG. 14. The processing (processing in step S1206 described above) performed by the analysis unit 1104 having the functional configuration example illustrated in FIG. 14 will be described with reference to the flowchart in FIG. 13.

In step S1301, an extraction unit 1401 calculates the edge intensity image e of the dark channel image d. Here, as for the edge intensity image, similarly to step S604 described above, for each pixel in the dark channel image d, an edge intensity image e having, as a pixel value of a pixel, "edge intensity corresponding to the pixel" obtained by applying the Laplacian filter to eight vicinities of the pixel to have an absolute value is generated.

In step S1302, a calculation unit 1402 calculates a histogram distribution H(i) (i.e., distribution of the edge intensity) of the pixel values in the edge intensity image e generated in step S1301. Here, i represents a pixel value, and H(i) represents the number of pixels having the pixel value i in the edge intensity image e.

In step S1303, a calculation unit 1403 calculates the variance v of a histogram distribution H(i) by performing an arithmetic operation according to the following (Formula 7) using the histogram distribution H(i) calculated in step S1302.

[Equation 7]

$$v = \frac{1}{Z}\sum\nolimits_{i=1}^{Z}\left(H(i)-\bar{H}\right)^2 \qquad \text{(Formula 7)}$$

Here, two items in the parentheses on the right side represent an average of H(1) to H(Z) (Z is the number of pixel values). In step S1304, a conversion unit 1404 determines the number N of times of filter application from the variance v obtained in step S1303.

When the variance v is large, it means that there are many edges of the dark channel image. That is, since the halo is likely to occur, as illustrated in FIG. 15 illustrating the relationship between the variance v and the number N of times of filter application, the reduction effect of the halo is set to be strong by setting the number N of times of filter application to be large. On the other hand, when the variance v is small, it means that there are few edges of the dark channel image. That is, since the halo hardly occurs, the number N of times of filter application is set to be small as illustrated in FIG. 15.

That is, the conversion unit 1404 determines the number N of times of filter application as N1 when the variance v=v1, and determines the number N of times of filter application as N2 (>N1) when the variance v=v2 (>v1). The determination method of the number N of times of filter application based on the variance v is not limited to a specific determination method as long as a larger number N of times of filter application is determined as the variance v is larger and a smaller number N of times of filter application is determined as the variance v is smaller.

As such, according to the present embodiment, by changing the number of times of filter application according to the characteristics of the scene, it is possible to set the optimum number of times of filter application for the scene. This makes it possible to perform high-speed processing when the distance to the subject is short or when the distance difference to the subject is small as the characteristics of the scene.

Fourth Embodiment

In each of the above embodiments, the image processing apparatus 100 and the camera 101 are separate apparatuses, but the image processing apparatus 100 and the camera 101 may be integrated to constitute one apparatus having the function of the image processing apparatus 100 and the function of the camera 101.

The image processing apparatus 100 may be implemented by a plurality of computer apparatuses, and the processing described as the processing performed by the image processing apparatus 100 may be executed by distributed processing by the plurality of computer apparatuses.

The image processing apparatus 100 may perform a part of the processing described as the processing performed by the camera 101, or the camera 101 may perform a part of the processing described as the processing performed by the image processing apparatus 100.

In each of the above embodiments, the output destination of the output image J' is the display 103, but the output destination of the output image J' is not limited to the display 103. For example, the output image J' may be transmitted to an external apparatus via a network line such as a LAN or the Internet, or may be stored in a memory of the image processing apparatus 100 or another apparatus.

In each of the above embodiments, the image processing apparatus 100 acquires the input image I and then converts the input image I into the linear RGB image I', but the image processing apparatus 100 may acquire not the input image I but the linear RGB image I'. In this case, the conversion units 301, 801, and 1101 described above become unnecessary, and thus the processing of steps S403, S903, and S1203 become unnecessary.

Alternatively, the numerical values, processing timings, processing orders, processing entities, and data (information) acquiring method/transmission destination/transmission source/storage location, and the like, used in the embodiments described above are referred to by way of an example for specific description, and are not intended to be limited to these examples.

Alternatively, some or all of the embodiments described above may be used in combination as appropriate. Alternatively, some or all of the embodiments described above may be selectively used.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
at least one processor coupled to a memory, serving as:
    a calculation unit configured to calculate ambient light based on an input image;
    a first generation unit configured to generate a dark channel image having a minimum value of a color channel of a partial region in the input image as a pixel value based on the input image and the ambient light, and to generate a transmittance distribution of atmosphere based on the dark channel image;
    a shaping unit configured to perform processing of shaping the transmittance distribution a plurality of times, wherein the shaping unit shapes the transmittance distribution by performing a plurality of times of filter processing that can separate an edge and a flat portion of a graph that shows the transmittance distribution, using a luminance image based on the input image; and
    a second generation unit configured to generate a corrected image in which contrast of the input image is corrected based on a shaped transmittance distribution shaped by the shaping unit and the ambient light.

2. The image processing apparatus according to claim 1, wherein the first generation unit generates a dark channel image corresponding to each of the input image and a plurality of reduced images using the input image, the plurality of reduced images of the input image, and the ambient light, generates a map of a distance boundary representing a boundary surface of subjects having different distances based on an edge intensity of a dark channel image corresponding to the input image, generates a synthesized dark channel image in which the dark channel image corresponding to each of the input image and the plurality of reduced images are synthesized based on the map, and generates the transmittance distribution based on the synthesized dark channel image.

3. The image processing apparatus according to claim 1, wherein the first generation unit generates the dark channel image corresponding to the input image by using the input image and the ambient light, generates a map of a distance boundary representing a boundary surface of subjects having different distances based on an edge intensity of the dark channel image corresponding to the input image, and generates a transmittance distribution of atmosphere based on the generated dark channel image, and
    the shaping unit further performs, a number of times corresponding to the map, filter processing that can separate an edge and the flat portion of the graph that shows the transmittance distribution using the luminance image based on the input image.

4. The image processing apparatus according to claim 1, wherein the first generation unit generates the dark channel image corresponding to the input image by using the input image and the ambient light, obtains a distribution of an edge intensity of the dark channel image corresponding to the input image, and generates a transmittance distribution of atmosphere based on the generated dark channel image, and
    the shaping unit further performs, a number of times corresponding to a variance in the distribution, filter processing that can separate an edge and the flat portion of the graph that shows the transmittance distribution using the luminance image based on the input image.

5. The image processing apparatus according to claim 1, wherein the second generation unit performs gamma correction on the corrected image.

6. The image processing apparatus according to claim 1, wherein the input image is an image exhibiting linear characteristics with respect to luminance.

7. An image processing method comprising:
calculating ambient light based on an input image;
generating a dark channel image having a minimum value of a color channel of a partial region in the input image as a pixel value based on the input image and the ambient light, and generating a transmittance distribution of atmosphere based on the dark channel image;
performing processing of shaping the transmittance distribution a plurality of times, wherein the shaping shapes the transmittance distribution by performing a plurality of times of filter processing that can separate an edge and a flat portion of a graph that shows the transmittance distribution, using a luminance image based on the input image; and
generating a corrected image in which contrast of the input image is corrected based on a shaped transmittance distribution and the ambient light.

8. A non-transitory computer-readable storage medium storing a computer program for causing a computer to function as:
    a calculation unit configured to calculate ambient light based on an input image;
    a first generation unit configured to generate a dark channel image having a minimum value of a color channel of a partial region in the input image as a pixel value based on the input image and the ambient light, and generate a transmittance distribution of atmosphere based on the dark channel image;
    a shaping unit configured to perform processing of shaping the transmittance distribution a plurality of times, wherein the shaping unit shapes the transmittance distribution by performing a plurality of times of filter processing that can separate an edge and a flat portion of a graph that shows the transmittance distribution, using a luminance image based on the input image; and
    a second generation unit configured to generate a corrected image in which contrast of the input image is corrected based on a shaped transmittance distribution shaped by the shaping unit and the ambient light.

9. The non-transitory computer-readable storage medium according to claim 8, wherein the first generation unit generates a dark channel image corresponding to each of the input image and a plurality of reduced images using the input image, the plurality of reduced images of the input image, and the ambient light, generates a map of a distance boundary representing a boundary surface of subjects having different distances based on an edge intensity of a dark channel image corresponding to the input image, generates a synthesized dark channel image in which the dark channel image corresponding to each of the input image and the plurality of reduced images are synthesized based on the map, and generates the transmittance distribution based on the synthesized dark channel image.

10. The non-transitory computer-readable storage medium according to claim 8, wherein the first generation unit generates the dark channel image corresponding to the input image by using the input image and the ambient light, generates a map of a distance boundary representing a boundary surface of subjects having different distances based on an edge intensity of the dark channel image corresponding to the input image, and generates a transmittance distribution of atmosphere based on the generated dark channel image, and the shaping unit further performs, a number of times corresponding to the map, filter processing that can separate an edge and the flat portion of the graph that shows the transmittance distribution using the luminance image based on the input image.

11. The non-transitory computer-readable storage medium according to claim 8, wherein the first generation unit generates the dark channel image corresponding to the input image by using the input image and the ambient light, obtains a distribution of an edge intensity of the dark channel image corresponding to the input image, and generates a transmittance distribution of atmosphere based on the generated dark channel image, and the shaping unit further performs, a number of times corresponding to a variance in the distribution, filter processing that can separate an edge and the flat portion of the graph that shows the transmittance distribution using the luminance image based on the input image.

12. The non-transitory computer-readable storage medium according to claim 8, wherein the second generation unit performs gamma correction on the corrected image.

13. The non-transitory computer-readable storage medium according to claim 8, wherein the input image is an image exhibiting linear characteristics with respect to luminance.

* * * * *